(12) United States Patent
Franken et al.

(10) Patent No.: US 8,010,981 B2
(45) Date of Patent: Aug. 30, 2011

(54) METHOD AND SYSTEM FOR CREATING TELEVISION PROGRAMMING GUIDE

(75) Inventors: Kenneth A. Franken, Iowa City, IA (US); Toufic Moubarak, Iowa City, IA (US); Jack Perry, Marion, IA (US)

(73) Assignee: Decisionmark Corp., Cedar Rapids, IA (US)

( * ) Notice: Subject to any disclaimer, the term of this patent is extended or adjusted under 35 U.S.C. 154(b) by 994 days.

(21) Appl. No.: 11/466,642

(22) Filed: Aug. 23, 2006

(65) Prior Publication Data
US 2007/0016932 A1    Jan. 18, 2007

Related U.S. Application Data

(63) Continuation-in-part of application No. 10/248,674, filed on Feb. 7, 2003, which is a continuation of application No. 09/681,171, filed on Feb. 8, 2001, now Pat. No. 6,785,904.

(51) Int. Cl.
*H04N 5/445* (2006.01)
*G06F 3/00* (2006.01)
*G06F 13/00* (2006.01)

(52) U.S. Cl. .................. 725/51; 725/48; 725/50

(58) Field of Classification Search .............. None
See application file for complete search history.

(56) References Cited

U.S. PATENT DOCUMENTS

| | | | |
|---|---|---|---|
| 4,701,934 A | 10/1987 | Jasper | |
| 5,535,430 A | 7/1996 | Aoki et al. | |
| 5,587,715 A | 12/1996 | Lewis | |
| 5,623,613 A * | 4/1997 | Rowe et al. | 715/841 |
| 5,778,135 A | 7/1998 | Ottesen et al. | |
| 5,778,317 A | 7/1998 | Kaminsky | |
| 5,796,948 A | 8/1998 | Cohen | |
| 5,797,082 A | 8/1998 | Lusignan | |
| 5,848,418 A | 12/1998 | De Souza et al. | |
| 5,950,127 A | 9/1999 | Nitta et al. | |
| 5,955,988 A * | 9/1999 | Blonstein et al. | 342/359 |
| 6,002,394 A | 12/1999 | Schein et al. | |
| 6,144,944 A | 11/2000 | Kurtzman, II et al. | |
| 6,147,642 A | 11/2000 | Perry et al. | |
| 6,154,172 A | 11/2000 | Piccionelli et al. | |
| 6,160,545 A * | 12/2000 | Eyer et al. | 715/721 |

(Continued)

FOREIGN PATENT DOCUMENTS

EP  1234442 B1  5/2003

(Continued)

OTHER PUBLICATIONS

Weiner, M. "Use of the Longley-Rice and Johnson-Gierhart Tropospheric Radio Propagation Programs: 0.02-20GHz." IEEE Journal on Selected Areas in Communication, vol. 4 SAC-4, No. 2 (Mar. 1986), p. 297-307.*

*Primary Examiner* — Brian T Pendleton
*Assistant Examiner* — Ryan Stronczer
(74) *Attorney, Agent, or Firm* — Simmons Perrine Moyer Bergman PLC

(57) ABSTRACT

A household level electronic program guide which provides a PC user with a specific guide of television stations which are available at a location where a cable has been scanned to determine the television channels and stations being broadcast thereon and being provided to the PC.

3 Claims, 3 Drawing Sheets

U.S. PATENT DOCUMENTS

| | | |
|---|---|---|
| 6,209,100 B1 | 3/2001 | Robertson et al. |
| 6,252,547 B1 | 6/2001 | Perry et al. |
| 6,332,127 B1 | 12/2001 | Bandera et al. |
| 6,362,837 B1 | 3/2002 | Ginn |
| 6,463,265 B1 * | 10/2002 | Cohen et al. ............... 455/186.1 |
| 6,487,538 B1 | 11/2002 | Gupta et al. |
| 6,606,659 B1 | 8/2003 | Hegli et al. |
| 6,637,029 B1 * | 10/2003 | Maissel et al. ................. 725/46 |
| 6,698,020 B1 | 2/2004 | Zigmond et al. |
| 6,732,176 B1 | 5/2004 | Stewart et al. |
| 6,742,032 B1 | 5/2004 | Castellani et al. |
| 6,748,422 B2 | 6/2004 | Morin et al. |
| 6,754,833 B1 | 6/2004 | Black et al. |
| 6,785,904 B1 | 8/2004 | Franken et al. |
| 6,792,615 B1 * | 9/2004 | Rowe et al. ..................... 725/37 |
| 6,804,675 B1 | 10/2004 | Knight et al. |
| 6,807,566 B1 | 10/2004 | Bates et al. |
| 6,829,599 B2 | 12/2004 | Chidlovskii |
| 6,829,613 B1 | 12/2004 | Liddy |
| 6,859,791 B1 | 2/2005 | Spagna et al. |
| 6,898,571 B1 | 5/2005 | Val et al. |
| 6,912,398 B1 | 6/2005 | Domnitz |
| 6,966,028 B1 | 11/2005 | Beebe |
| 6,968,513 B1 | 11/2005 | Rinebold et al. |
| 6,976,010 B2 | 12/2005 | Banerjee et al. |
| 7,024,676 B1 * | 4/2006 | Klopfenstein ................... 725/49 |
| 7,062,533 B2 | 6/2006 | Brown et al. |
| 7,069,234 B1 | 6/2006 | Cornelius et al. |
| 7,069,319 B2 | 6/2006 | Zellner et al. |
| 7,089,194 B1 | 8/2006 | Berstis et al. |
| 7,092,953 B1 | 8/2006 | Haynes |
| 7,103,215 B2 | 9/2006 | Buzuloiu et al. |
| 7,120,615 B2 | 10/2006 | Sullivan et al. |
| 7,124,101 B1 | 10/2006 | Mikurak |
| 7,136,875 B2 | 11/2006 | Anderson et al. |
| 7,162,471 B1 | 1/2007 | Knight et al. |
| 7,162,508 B2 | 1/2007 | Messina |
| 7,165,041 B1 | 1/2007 | Guheen et al. |
| 7,171,620 B2 | 1/2007 | Castellani et al. |
| 7,174,453 B2 | 2/2007 | Lu |
| 7,200,635 B2 | 4/2007 | Yashchin et al. |
| 7,219,148 B2 | 5/2007 | Rounthwaite et al. |
| 7,219,153 B1 | 5/2007 | Day |
| 7,222,157 B1 | 5/2007 | Sutton, Jr. et al. |
| 7,222,163 B1 | 5/2007 | Girouard et al. |
| 2001/0025255 A1 | 9/2001 | Gaudian |
| 2001/0037415 A1 | 11/2001 | Freishtat et al. |
| 2002/0083016 A1 | 6/2002 | Dittrich et al. |
| 2002/0095332 A1 | 7/2002 | Doherty et al. |
| 2002/0107701 A1 | 8/2002 | Batty et al. |
| 2002/0199188 A1 | 12/2002 | Sie et al. |
| 2003/0004880 A1 | 1/2003 | Banerjee et al. |
| 2003/0005445 A1 * | 1/2003 | Schein et al. ..................... 725/51 |
| 2003/0110130 A1 | 6/2003 | Pelletier |
| 2003/0131355 A1 * | 7/2003 | Berenson et al. ................ 725/46 |
| 2003/0154249 A1 | 8/2003 | Crockett et al. |
| 2003/0165241 A1 | 9/2003 | Fransdonk |
| 2003/0171990 A1 | 9/2003 | Rao et al. |
| 2003/0188310 A1 * | 10/2003 | Klosterman et al. ............ 725/42 |
| 2003/0217362 A1 * | 11/2003 | Summers et al. ................ 725/63 |
| 2004/0003402 A1 * | 1/2004 | McKenna, Jr. ................. 725/46 |
| 2004/0034559 A1 | 2/2004 | Harris et al. |
| 2004/0076279 A1 | 4/2004 | Taschereau |
| 2004/0083133 A1 | 4/2004 | Nicholas et al. |
| 2004/0143667 A1 | 7/2004 | Jerome |
| 2004/0236832 A1 | 11/2004 | Morris et al. |
| 2005/0050097 A1 | 3/2005 | Yeh et al. |
| 2005/0071178 A1 | 3/2005 | Beckstrom et al. |
| 2005/0071417 A1 | 3/2005 | Taylor et al. |
| 2005/0075929 A1 | 4/2005 | Wolinsky et al. |
| 2005/0086112 A1 | 4/2005 | Shkedi |
| 2005/0165615 A1 | 7/2005 | Minar |
| 2005/0187823 A1 | 8/2005 | Howes |
| 2005/0203849 A1 | 9/2005 | Benson |
| 2005/0204005 A1 | 9/2005 | Purcell et al. |
| 2005/0240487 A1 | 10/2005 | Nemetz et al. |
| 2005/0251399 A1 | 11/2005 | Agarwal et al. |
| 2005/0256929 A1 | 11/2005 | Bartol et al. |
| 2005/0286721 A1 | 12/2005 | Lamberg |
| 2005/0289145 A1 | 12/2005 | Voegel |
| 2006/0020714 A1 | 1/2006 | Girouard et al. |
| 2006/0031483 A1 | 2/2006 | Lund et al. |
| 2006/0058951 A1 | 3/2006 | Cooper et al. |
| 2006/0095502 A1 | 5/2006 | Lewis et al. |
| 2006/0106866 A1 | 5/2006 | Green et al. |
| 2006/0173985 A1 | 8/2006 | Moore |
| 2006/0229899 A1 | 10/2006 | Hyder et al. |
| 2006/0235824 A1 | 10/2006 | Cheung et al. |
| 2006/0236257 A1 | 10/2006 | Othmer et al. |
| 2006/0242072 A1 | 10/2006 | Peled et al. |
| 2006/0253784 A1 | 11/2006 | Bower et al. |
| 2006/0282328 A1 | 12/2006 | Gerace et al. |
| 2006/0282426 A1 | 12/2006 | Spears |
| 2006/0287916 A1 | 12/2006 | Starr et al. |
| 2007/0011155 A1 | 1/2007 | Sarkar |
| 2007/0016598 A1 | 1/2007 | Tessman, Jr. et al. |
| 2007/0027770 A1 | 2/2007 | Collins et al. |
| 2007/0038567 A1 | 2/2007 | Allaire et al. |
| 2007/0040850 A1 | 2/2007 | Coleman |
| 2007/0047568 A1 | 3/2007 | Wang et al. |
| 2007/0061363 A1 | 3/2007 | Ramer et al. |
| 2007/0061839 A1 | 3/2007 | South, Jr. |
| 2007/0063999 A1 | 3/2007 | Park |
| 2007/0070978 A1 | 3/2007 | Bell et al. |
| 2007/0078675 A1 | 4/2007 | Kaplan |
| 2007/0078709 A1 | 4/2007 | Rajaram |
| 2007/0083408 A1 | 4/2007 | Altberg et al. |
| 2007/0083929 A1 | 4/2007 | Sprosts et al. |
| 2007/0094263 A1 | 4/2007 | Tessman, Jr. et al. |
| 2007/0100690 A1 | 5/2007 | Hopkins |
| 2007/0112678 A1 | 5/2007 | Himelfarb |
| 2007/0112735 A1 | 5/2007 | Holloway et al. |
| 2007/0116037 A1 | 5/2007 | Moore |
| 2007/0118533 A1 | 5/2007 | Ramer et al. |
| 2007/0123275 A1 | 5/2007 | Faraz |
| 2007/0124207 A1 | 5/2007 | Faber et al. |
| 2007/0127555 A1 | 6/2007 | Lynch |
| 2007/0127650 A1 | 6/2007 | Altberg et al. |
| 2007/0130014 A1 | 6/2007 | Altberg et al. |
| 2007/0130015 A1 | 6/2007 | Starr et al. |
| 2007/0133034 A1 | 6/2007 | Jindal et al. |
| 2007/0135991 A1 | 6/2007 | Riise et al. |
| 2007/0136428 A1 | 6/2007 | Boutboul et al. |

FOREIGN PATENT DOCUMENTS

| | | |
|---|---|---|
| GB | 2377510 A | 1/2003 |
| GB | 2428832 A | 2/2007 |
| WO | WO 02 23435 | 3/2002 |
| WO | WO 03038695 A1 | 8/2003 |
| WO | WO 2007 044500 A2 | 4/2007 |

* cited by examiner

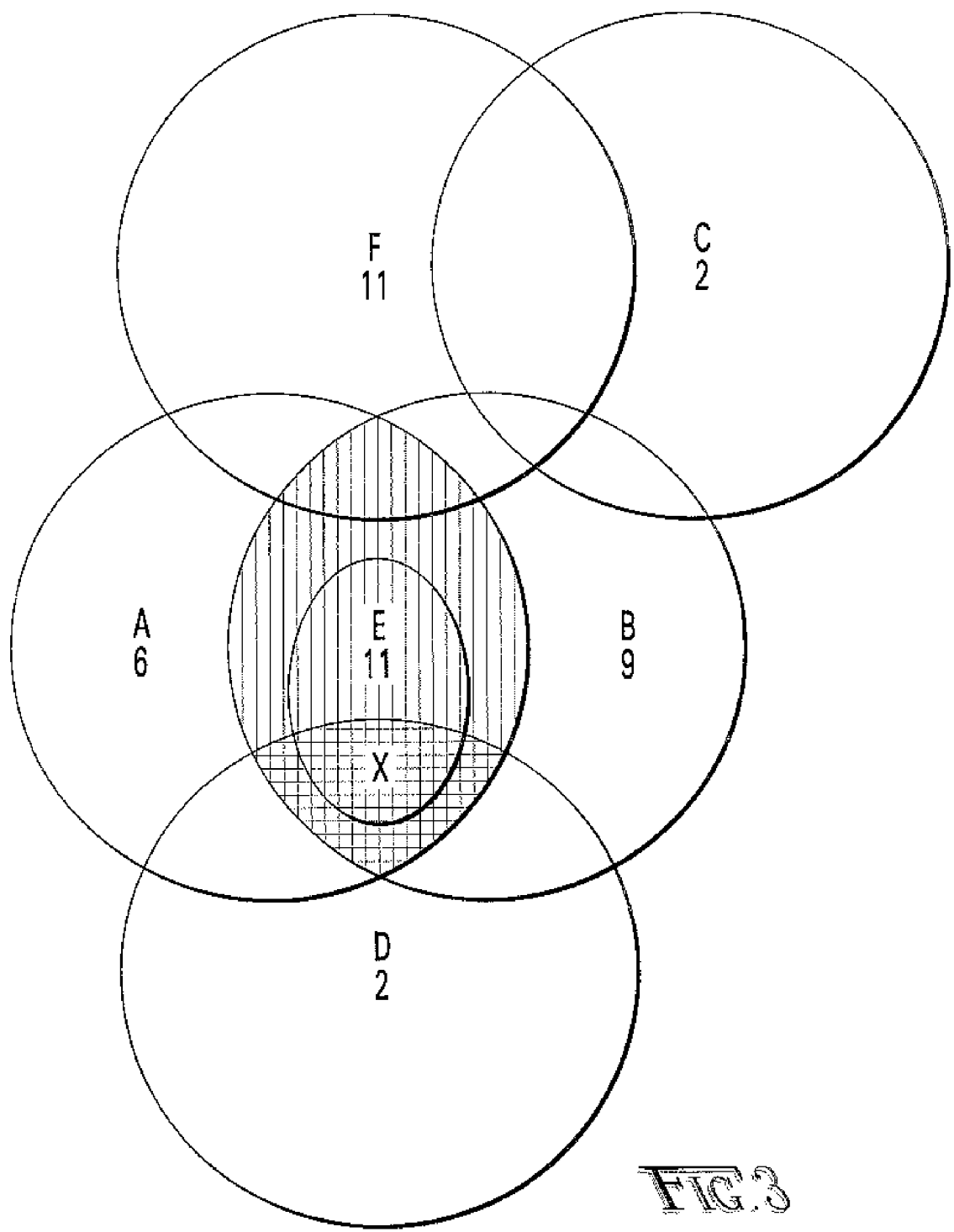

METHOD AND SYSTEM FOR CREATING TELEVISION PROGRAMMING GUIDE

CROSS REFERENCE TO RELATED APPLICATIONS

This application claims the benefit of the filing date of and is a continuation-in-part application of application Ser. No. 10/248,674 filed on Feb. 7, 2003 by Kenneth A. Franken, Toufic Moubarak and Jack Perry entitled "Method and system for providing household level television programming information", which itself is a continuation of application Ser. No. 09/681,171 filed on Feb. 8, 2001, entitled "Method and system for providing household level television programming information" by the same inventors, which application has issued as U.S. Pat. No. 6,785,904 on Aug. 31, 2004. This application is also related to co-pending application entitled "Individualized Content Guide" by the same inventors filed on Feb. 8, 2001, having Ser. No. 09/681,172. The above-referenced applications and patents are incorporated herein in their entirety by this reference.

BACKGROUND OF INVENTION

There are several systems currently in use for creating electronic program guides for television programming. Cable television lineups often include one channel that provides a continuously scrolling grid of current and upcoming program information for the various channels carried by the cable system. These systems are relatively simple to implement, but they lack convenience for users: there is no way for the user to go directly to a given channel and time (other than waiting for that channel/time to scroll into view).

Another way of constructing an electronic program guide is to include data about the content within the content stream. This in-band data is used by most broadcast, cable and satellite digital television systems. The receiving device reads the data out of the content stream and then uses the data to populate an electronic program guide. Some systems, mostly cable and satellite, include a single data feed that encompasses all channels carried by the system. Other systems embed data into each content stream; this is the system used by broadcast television (PSIP). In either of these systems, the content distributor is responsible for supplying the data. It is impossible, or at least inconvenient, for users to specify another source for the data.

With in-band data, the content distributor is responsible for deciding how much data to include in the stream and how quickly to deliver it in the stream. The content distributor could decide to provide a large quantity of data in a short time, but this requires substantial bandwidth. The alternatives are to provide a small amount of data, or to spread the data over a long time, but either alternative has drawbacks. The amount of data can be minimized by limiting the time coverage (e.g., send one day's data instead of fourteen days' data) or by limiting the size of the individual items (e.g., limit program descriptions to 255 characters); in either case, the user gets less information about the programming. Another way to minimize the size of the data is to compress it. This can be very effective in limiting the size of the data, but can cause extra expense on the client side to decompress the data. If the data is delivered over a long period of time, the bandwidth is minimized, but it may take a long time for users to get a full set of data. In summary, in-band data can be effective, but it is often not very flexible.

One alternative to in-band data is to get the data describing the content from a source other than the actual content stream, usually a remote server. This requires that the client device have a way to communicate with the remote server, but has the advantage of being very flexible: every client device can potentially get a data set that is optimized for its configuration and capabilities. In the usual implementation of this method, the user is required to initialize the client device, usually supplying a zip code and picking a service provider (cable system, over the air, etc.) the first time the client device is turned on. The client device then contacts the remote server to get a set of data for the relevant service provider.

There are several problems with this implementation. First, it requires user input, which is generally problematic. Second, it assumes that the remote server can accurately determine what channels the client device can receive. In the case of over-the-air television transmissions, the set of channels received can vary over the span of a few feet, let alone the area of a zip code. In the case of cable systems, the set of channels that a given customer can receive is dependent on that customer's specific subscription package. The proliferation of subscription options means that, in general, no one but the cable operator is likely to know exactly what channels are included in today's package.

Many systems deal with the uncertainty of lineup information by allowing the customer to add or delete channels, producing a custom lineup for each customer. In theory, this is fine. In practice, however, lineups change, invalidating the customers' changes. There is also the problem with requiring customer input.

SUMMARY OF THE INVENTION

The present invention addresses the limitations of current systems for creating electronic program guides In one embodiment, it scans through all of the television channels available to a specific client device and reports the content of each channel to a remote server. In one embodiment, the remote server identifies each of the channels, looks up the programming schedule for each of the channels, and creates a set of program data that is customized for the capabilities of the specific client device and the channels that are available. In one embodiment, the channel scan is performed at regular intervals or when requested by the user, so it guards against the problem of changing lineups. In one embodiment, the channel scan is automatic, so it eliminates the problem of requiring user input. In one embodiment, the data set is customized to an individual device; thus, it addresses the problems of balancing bandwidth requirements against device capabilities and requirements. The custom channel lineup eliminates the problem of the remote server not being able to accurately determine an individual lineup. In one embodiment, the system relies on out-of-band data, which gives the user choice over who supplies the data and also eliminates the burden on the content distributor to obtain accurate programming data.

BRIEF DESCRIPTION OF THE DRAWINGS

FIG. 3 is a Venn diagram partially describing the process of the present invention.

DETAILED DESCRIPTION

In the following description, it will be assumed that the implementation is done using a commercially available personal computer and commercially available television tuner expansion cards; however, an actual production implementation would likely use more specialized components. The use of specialized components does not change the overall functionality.

Also, the following description will assume NTSC (analog) television reception. It would be straightforward to extend the implementation to cover ATSC or other digital television reception.

Figure 1:
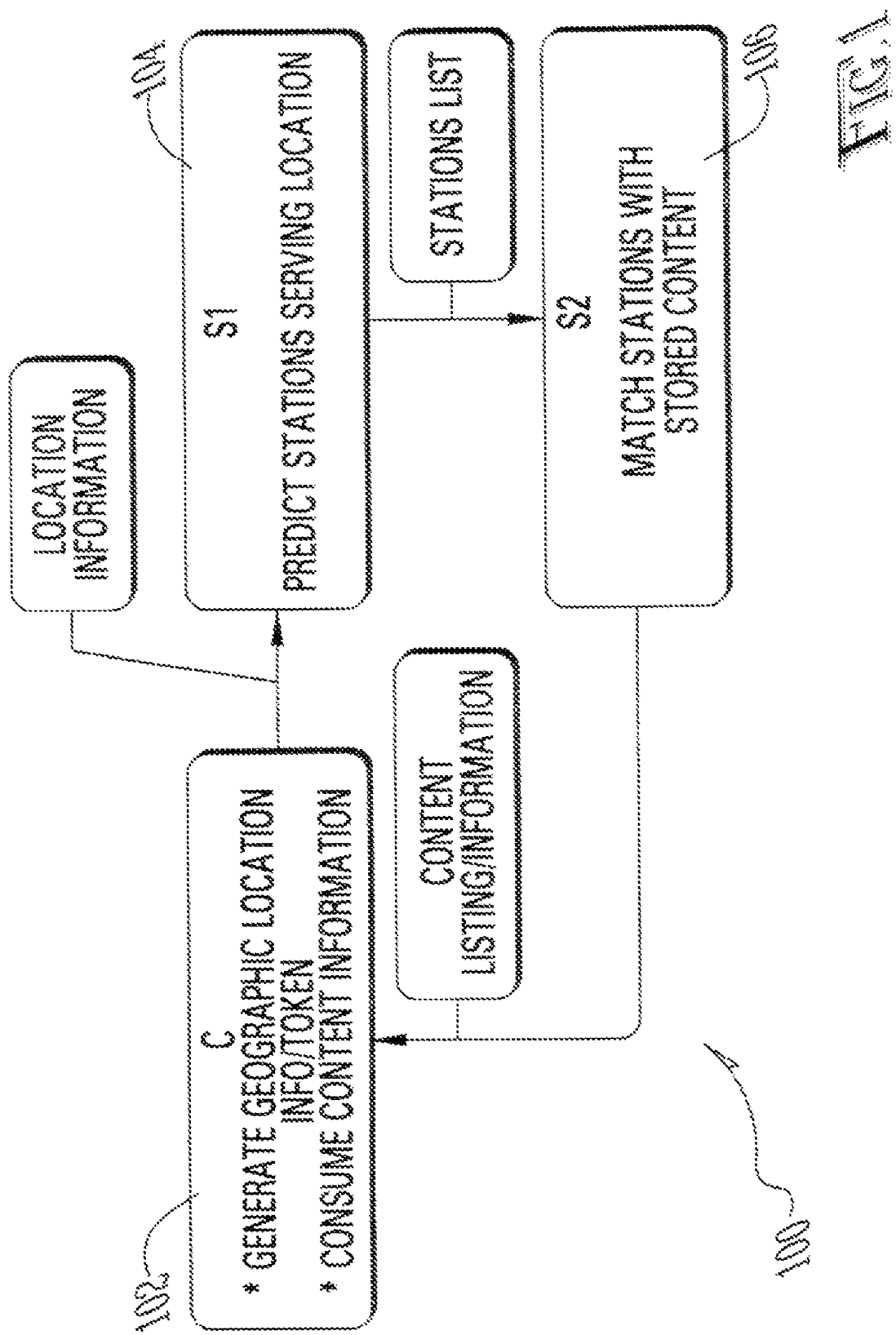
FIG. 1 is a block diagram of the system of the present invention.

Now referring to the drawings wherein lice numerals refer to like matter throughout, and more specifically referring to FIG. 1, there is shown a system of the present invention generally designated 100, including a consumer PC 102. Consumer PC 102 can be a general-purpose computer or any type of information appliance capable of receiving and displaying information from/to an operator. At least some of the information exiting the consumer PC 102 is representative of a unique location of the consumer PC 102. For example, street address, lat/lon coordinates, or some other unique location identifier (such as a 9-digit zip code or a token that identifies location information stored on another computer) is output by consumer PC 102. This can be as a result of user input, such as a keyboard and data entry screen, or it may be a computer-provided token. Street address is used herein to refer to a typical household address with a house number and a street name. This unique location information is provided, via a network, the Internet, or other digital data communication system, to a station prediction server 104. In a preferred embodiment, consumer PC 102 is coupled to station prediction server 104 via a broadband internet connection which is a coaxial cable TV cable which provides internet access to said consumer PC 102. It should be understood that other means of information transmission could be used as well, such as telephone, DSL, wireless, etc. Consumer PC 102 may be a simple stand-alone PC or in a preferred embodiment, it is coupled to a television set or has a PCTV board therein for receiving broadcast, cable, or satellite television signals. The term "PCTV board" is used to describe any type of apparatus used in conjunction with a microprocessor in a PC which is capable of receiving and demodulating an incoming television signal irrespective if it is terrestrially broadcast or provided over a cable TV network. It is also believed that television programming will become available over the Internet so the consumer PC 102 would be preferably capable of receiving programming (which is also broadcast on terrestrial television station broadcasts), along with other web-based content.

Generally, station prediction server 104 will perform computations to generate a list of electronically transmitted programming options which are available to the viewer. This could be, but need not be, limited to a list of broadcast television or radio stations which will be available for use by the viewer. The list could also include television stations which are available over the Internet. These computations can include signal strength computations for the terrestrial broadcast signals in the vicinity of the user's location. Various methods of signal strength calculations are possible. Depending upon tradeoffs made regarding the speed and the accuracy of the station prediction server, the software to perform these tasks can range from simple theoretical or empirical propagation curves to the more elaborate Longley-Rice computations, with adjustments for the type of antenna and antenna-mounting environment, as well as terrain or obstructions between the transmitter and the receiver at the user's location. Details of performing the signal strength calculations and station determination are provided in the above-referenced co-pending applications.

Station prediction server 104 could also use the location information to determine which cable providers serve the viewer's location.

Consumer PC 102 can also be used by the consumer or viewer to provide useful information, such as the level of cable TV or satellite TV services if any, actually subscribed to by the consumer. Consumer PC 102 can also be used to convey information relating to other preferences (other than mere ability to receive the signal) with which the consumer might like to have programming information pre-processed before being used by the consumer; e.g., the program listings can be sorted by type or category of programming desired by the consumer, such as sports, full-length movies, etc. More detail on such individualized programming guides is included in the above-referenced patent application entitled "Individualized Content Guide."

Station prediction server 104 further has information therein, or accessible therefrom, relating to stations and channels and other programming available via cable (CATV or cable radio) and satellite delivery to various locations. This information is available for purchase from sources such as Tribune Media Services of 435 N. Michigan Ave., Suite 1500, Chicago, Ill.

Programming content matching server 106 takes a station list from station prediction server 104 and matches these stations with well-known programming content for such stations, and provides household level customized content listing back to the consumer PC 102. The information to perform this step is also available from sources listed in the preceding paragraph.

The programming content matching server 106 can now assign a particular channel number to the programming available at the household level. This relieves the viewer from the task of associating station call letters or network affiliations to channel numbers. For example, a local FOX television affiliate may broadcast to two nearby viewers—one at a first location and another at a second location on a single UHF channel. The same channel might be provided to each of these viewers via their local cable providers (assuming the two locations are in nearby towns, each with independent cable TV operators). One cable TV provider might provide it on cable channel 8, and the other on cable channel 2. The present invention, via server 106, has a database of information available which can be used to provide each of these two viewers with the content of programming information available, as well as the proper cable channel assignments for their own cable operator.

Server 104 and server 106 are described herein as being distinct servers. It should be understood that this is merely one possible design. A single server could be used to perform the tasks of servers 104 and 106. Multiple servers could also be used as well.

In operation, the apparatus and method of the present invention as shown and described in FIG. 1, could function as follows:

1. A viewer, through an HTML data entry form, inputs a local address (street address or lat/lon, etc.) of a household or business location.

Alternatively, the viewer's computer will automatically provide such information through a token or otherwise.

2. The local address, if it is a street address, is geo-coded to determine lat/lon.

3. A signal strength prediction is made for the lat/lon for various terrestrially broadcast TV stations in the vicinity of the lat/lon.

4. A list of stations otherwise available to that lat/lon via cable or satellite is also generated, using a point in polygon method or another method, from a database providing detailed programming information for a variety of locations.

4. (a) The list of stations may be either expanded or restricted based upon business rules governing delivery of programming, such as sports blackouts, syndicated exclusivity, satellite delivered distant network service, etc.

5. A complete list of stations available to the viewer is then generated.

6. The complete list of stations is matched with stored programming content and with cable channel assignments, where appropriate.

7. The information is then preferably displayed to the viewer on consumer PC 102 in a format as described in the above-mentioned co-pending application entitled "Individualized Content Guide."

8. The viewer then can efficiently determine what programming is available on which channel. The viewer may elect to block a channel based upon this information. The viewer may elect to watch a particular channel, or the viewer may opt to avoid watching based upon this information. Numerous other uses of the information are possible.

It should be understood that the information generated by the present invention need not be used solely for displaying the same to customers. The information may be provided to other persons, entities or equipment where it could be stored, manipulated or otherwise used for another purpose.

Figure 2:
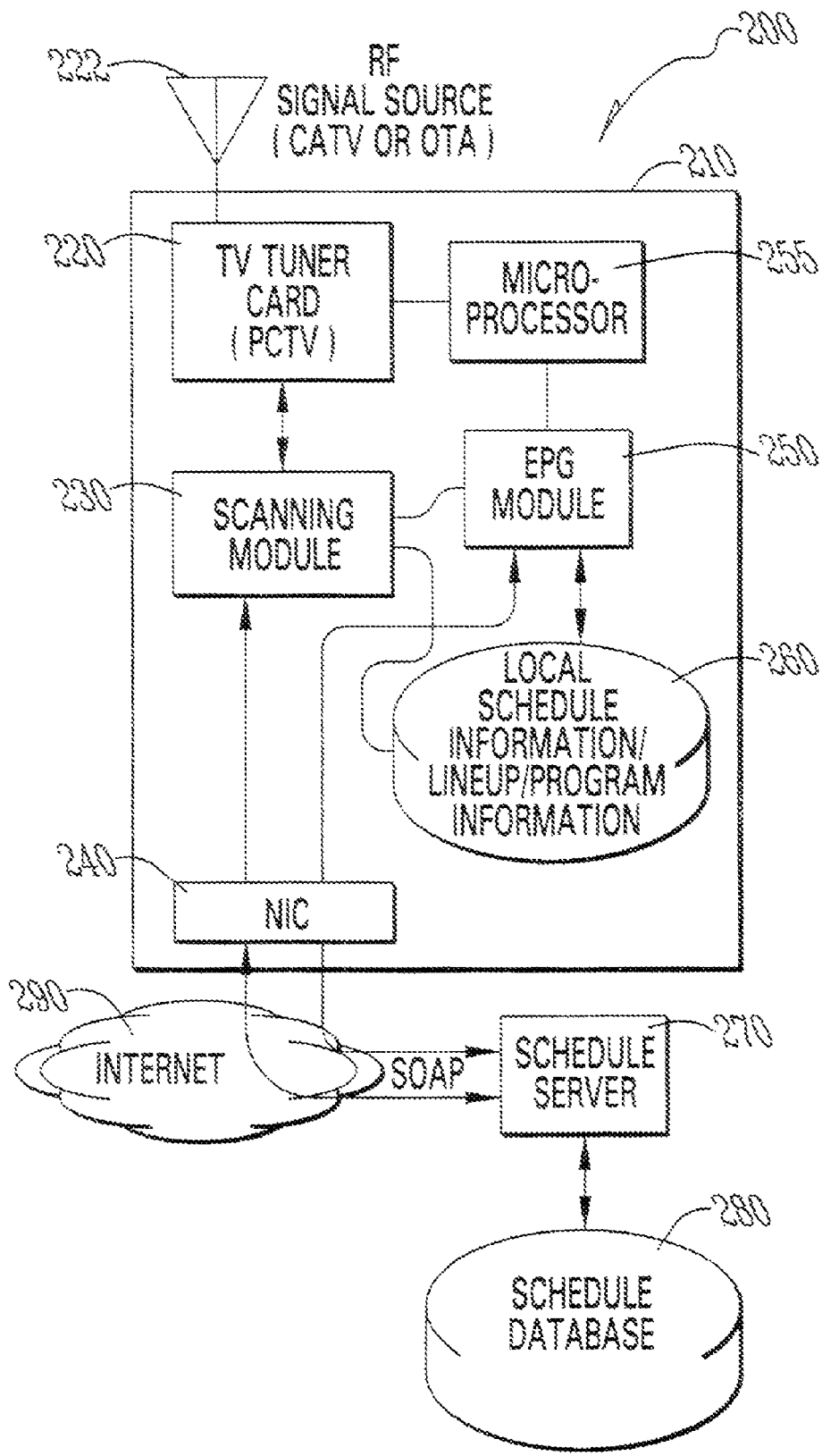
FIG. 2 is a block diagram of one embodiment of the present invention.

Now referring to FIGS. 2 and 3 and more specifically, FIG. 2 shows a block diagram of one embodiment of the invention, generally designated 200. A personal computer 210 with microprocessor 255 and PCTV card 220 installed is connected, via network interface card (NIC) 240, to a schedule server 270 via the public Internet 290. The PCTV card 220 is connected to a television antenna 222 or cable television signal via coaxial cable. The PC 210 hosts a scanning module 230, which is an executable program. The schedule server 270 is in communication with a schedule database 280.

One process of the present invention is where the scanning module 230 conducts a scan of the available television channels as follows:

The scanning module 230 commands the PCTV card 220 to change to channel 2 and tries to find a Vertical Blanking Interval (VBI) signal in the TV tuner output. If it is unable to find a VBI signal, the channel is marked as "unused", and the scanning module continues with the next channel. If a VBI signal is found, it is decoded and examined for station identifying information and/or program identifying information. The format of the VBI signal is contained in EIA-608 "Line 21 Data Services for NTSC," available from:

Electronic Industries Association
Engineering Department
2001 Pennsylvania Avenue, N.W.
Washington, D.C. 20006
202 457-4900

The station and program information from the VBI data is stored with the channel number and frequency, and the scanning module continues with the next channel. This process is continued for all channels. The process is performed once with the tuner in "broadcast" mode and once with the tuner in "cable" mode (broadcast television uses a different set of frequencies than cable television, and TV tuners can switch modes to receive either set).

The channel, station and program information obtained by the channel sweep is packaged by the scanning module 230 and sent to the remote scheduling server 270 via the public Internet 290. In this implementation, the communication between the scanning module 230 and the scheduling server 270 may be done using SOAP Web Services, although this is a matter of designer's choice; other communication protocols could be easily substituted.

The scheduling server 270 examines the data provided by the scanning module 230 and attempts to identify the channel lineup. The first step is to determine whether the television tuner 220 is receiving an over-the-air broadcast signal or a cable signal. This is done by comparing the VBI data from the UHF channels in broadcast mode with the cable mode VBI data; the mode with the highest number of VBI signals is chosen as the dominant mode. Then, the scheduling server 270 attempts to identify the individual channels. In many cases, the VBI data will give the correct station call sign and network information, and identifying the station is trivial. Many stations do not transmit complete VBI data though, and these stations need to be identified using other information.

For cable mode lineups, one can compare the identified channels to the channel lineups of the cable head-ends in the schedule database. The methodology for efficiently computing the best match between one partially completed sequence and a set of fully identified sequences has been well researched in the area of genetic sequencing; extension to the current problem is straightforward and within the level of skill in the art.

For broadcast lineups, one of two methods to identify missing stations can be used. The first (and simplest) method is to pre-compute lineups for "synthetic head-ends". In this method, you calculate signal strengths for all of the broadcast television stations in the United States at a set of points. ZIP code centroids are convenient, but other sets of points may be preferable, depending on the circumstances. Each point is associated with the set of stations whose calculated signal strength is above some threshold; cutoffs for this implementation are given in Table 1. In this implementation, the signal strength is calculated using the Longley-Rice signal strength prediction algorithm, but other choices are possible. The point and its associated stations are treated as a "synthetic head-end", and the missing stations are found using the same sequence matching methodology as with the cable mode lineups. This is the preferred method for most applications, but the accuracy is somewhat constrained by the use of reception at a single point as a proxy for the reception at all locations near that point. (Note: This is similar to the function performed by Station Prediction Server 104 of FIG. 1)

In the second method for broadcast lineups, we can obtain higher accuracy of lineups, but at the cost of increased complexity. With this method, we construct signal area coverage polygons for each television station in the United States, using the Longley-Rice algorithm to predict the area where a station's signal strength exceeds some cutoff. The cutoff is chosen such that it represents a signal strength that can be decoded by a typical television reception system, with an allowance for uncertainty in the prediction algorithm; the cutoffs used in the current implementation are given in Table 1. The polygons are imported into a GIS program that allows one to calculate the intersection of arbitrarily complex polygons. The schedule server identifies unknown stations by first calculating the intersection of the signal areas of all of the known stations. Then, the signal areas of all stations with the same channel number as an unknown station are compared against this intersection area—any that overlap with the intersection area are determined to be candidate identities for the unknown station. An unknown station with a single candidate identity is considered to be identified, and its signal area is added to the intersection set—this helps to refine the intersection set as more stations are identified and generally allows for unambiguous identification of all unknown stations after a few have been identified.

FIG. 3 shows a simplified view of this process: the channel scan module 230 submitted channels 2, 6, 9 and 11 with call signs of unknown, A, B and unknown, respectively. The schedule server 270 first generates the intersection of stations A and B, shown as the vertically striped area in the figure. It then looks for overlap between the intersection area and the signal areas of all stations broadcasting on channel 2 (C and D in FIG. 3). In this case, only station D has a signal area that overlaps with the intersection area, so channel 2 is unambiguously identified as station D. The schedule server computes a new intersection set, consisting of the intersection of signal areas A, B and D, shown as the horizontally striped area in FIG. 3. This new intersection set is compared with the signal areas of all of the stations broadcasting the next unidentified channel, 11. As seen in FIG. 3, only station E has a signal area that overlaps with the {A, B, D} intersection set; so channel 11 is identified as station E.

The schedule server 270 creates a lineup of identified channels and queries the schedule database 280 for schedule information for each of the channels. In this implementation, the schedule information includes start time, duration, channel and program ID, but additional information, such as ratings information, repeat flag, etch, could be added for other applications. The schedule server 270 also queries the schedule database 280 for program information for each program ID in the schedule information. The program information used in this implementation includes program ID, title, description and an episode title (if applicable). Again, additional information is possible.

The schedule server 270 returns the set of identified channels, schedule information and program information to the scanning module 230, which stores the data for future use.

After the initial scan has been completed, the EPG module 250 can make use of the stored information to produce an Electronic Program Guide, using well-known methods. The schedule and program information needs to be refreshed periodically. In the current implementation, we store three (3) days of schedule and program data locally and refresh the local store 260 once per day. The refresh proceeds as follows: the EPG module 250 gets the lineup information from the local store 260, packages it and sends it to the schedule server 270 using a SOAP Web Services interface. The schedule server 270 queries the schedule database for schedule and program information for each of the stations in the lineup, as discussed previously. The schedule server 270 returns the lineup information, schedule information and program information to the EPG module 250, which stores the information for future use. In this implementation, the new information displaces the old information, but it is possible to implement a system that only deals with changes to the schedule and program information.

TABLE 1

Signal Strength Cutoffs for Broadcast Television

| Channel range | Cutoff (dBu) |
|---|---|
| 2-6 | 35 |
| 7-13 | 44 |
| 14+ | 52 |

It is thought that the method and apparatus of the present invention will be understood from the foregoing description and that it will be apparent that various changes may be made in the form, construction, steps and arrangement of the parts and steps thereof, without departing from the spirit and scope of the invention or sacrificing all of their material advantages. The form herein described is merely a preferred or exemplary embodiment thereof.

We claim:

1. An electronic programming guide apparatus comprising:
   a programmable electronic device at a first location;
   a computer system at a second location, coupled to said programmable electronic device via a network;
   said programmable electronic device providing information regarding said programmable electronic device at said first location to said computer system;
   said computer system configured to utilize a record of electronically transmitted programming which is available to be received at said first location, and for generating an electronic programming guide based upon said record;
   wherein the information regarding said programmable electronic device is the record of electronically transmitted programming which is available to be received at said first location and further wherein said programmable electronic device is a PC and said first location is a first household location;
   wherein the record is generated in response to repeatedly scanning actual electronic programming signals delivered to said first household location;
   wherein the electronic programming signals are received by a television tuner card disposed in the PC;
   wherein the PC is coupled to a schedule and descriptive programming information source via an internet connection; and
   wherein the computer system is configured to utilize a plurality of television station geographic reception areas and a plurality of overlapping geographic areas in associating a television station ID with a detected RF signal on a predetermined channel when generating the electronic program guide.

2. A method of generating an electronic programming guide comprising the steps of:
   providing a programmable electronic device at a first location;
   providing a remote computer coupled to the programmable electronic device via an internet connection:
   generating a record of television stations which are specifically available at the first location;
   generating a specific electronic program guide based upon the record;
   displaying the electronic program guide on the programmable electronic device;
   wherein the step of generating a record of television stations comprises the steps of:
   scanning a cable, with a tv tuner coupled to a microprocessor, at the first location to determine if a signal is present on one of a plurality of channels;
   repeating the step of scanning a cable for each of a plurality of different channels;
   generating a plurality of information entries of channels available for reception at the first location;
   transmitting to the remote computer the list of channels available for reception at the first location;
   associating on the remote computer a station with each of the plurality of information entries;
   and wherein the programmable electronic device is a PC and said first location is a first household location.

3. A method of providing an electronic program guide which is tailored for a specific location comprising the steps of:
- providing a radio frequency source of television programming to a television tuner disposed, at a first location, in a personal computer of the type having a microprocessor therein;
- scanning, at the first location, the radio frequency source of programming to make a determination that a programming signal is present and if an embedded station identification signal is also present;
- repeating the step of scanning for a plurality of predetermined channels;
- creating a table of channel numbers and station identification information;
- transmitting to a device at a second location the list of channels available for reception at the first location;
- determining at the second location station identification information of a first channel which has been received by the tuner and for which no embedded station identification information is present, by generating an intersection area of geographic broadcast areas of channels in the table where station identification has been previously determined and comparing the intersection area to a broadcast area of a station broadcasting on the first channel and making a determination of overlap if overlap exists between the intersection area and the broadcast area; and
- generating at the second location an electronic program guide tailored for said first location partially in response to the determination of overlap.

* * * * *